(12) United States Patent
Dyer

(10) Patent No.: US 11,072,923 B2
(45) Date of Patent: Jul. 27, 2021

(54) METHOD AND APPARATUS FOR ATTACHING PRE-FABRICATED WALLS TO FOUNDATION ANCHOR BOLTS

(71) Applicant: Katerra Inc., Menlo Park, CA (US)

(72) Inventor: Ronald Dyer, Norco, CA (US)

(73) Assignee: Katerra Inc., Menlo Park, CA (US)

( * ) Notice: Subject to any disclaimer, the term of this patent is extended or adjusted under 35 U.S.C. 154(b) by 99 days.

(21) Appl. No.: 16/653,032

(22) Filed: Oct. 15, 2019

(65) Prior Publication Data
US 2020/0115893 A1 Apr. 16, 2020

Related U.S. Application Data

(60) Provisional application No. 62/745,924, filed on Oct. 15, 2018.

(51) Int. Cl.
*E04B 1/41* (2006.01)
*E04B 2/56* (2006.01)

(52) U.S. Cl.
CPC . *E04B 1/40* (2013.01); *E04B 2/56* (2013.01)

(58) Field of Classification Search
CPC .................................. E04B 1/40; E04B 2/56
See application file for complete search history.

(56) References Cited

U.S. PATENT DOCUMENTS

| | | | | |
|---|---|---|---|---|
| 135,822 A * | 2/1873 | Laforge | ................ | E03B 9/10 137/371 |
| 1,153,797 A * | 9/1915 | Kegreisz | ................ | F16B 13/068 411/24 |
| 2,605,668 A * | 8/1952 | Hollopeter | ................ | E04B 1/40 411/342 |
| 3,403,594 A * | 10/1968 | Newell | ................ | E21D 21/008 411/344 |
| 3,920,145 A * | 11/1975 | McGregor | ................ | B60R 15/04 220/86.3 |
| 4,074,941 A * | 2/1978 | Jablonski | ................ | F21V 21/116 403/260 |
| 4,321,975 A * | 3/1982 | Dyer | ................ | E21B 21/01 166/88.1 |
| 4,456,212 A * | 6/1984 | Raftery | ................ | A47B 13/021 108/12 |
| D436,523 S * | 1/2001 | Smith | ................ | D8/385 |
| 8,737,043 B2 * | 5/2014 | Hughes | ................ | H01H 9/04 361/673 |
| 9,121,432 B2 * | 9/2015 | Wong | ................ | F16B 37/045 |

* cited by examiner

*Primary Examiner* — Gisele D Ford
(74) *Attorney, Agent, or Firm* — Volpe Koenig

(57) ABSTRACT

An apparatus for securing pre-fabricated wall panels to foundation anchor bolts is provided. The apparatus includes a mounting block including at least one hole and at least two facing spring assemblies. Each spring assembly includes a mechanical body, a spring, and an armature. The mechanical body is secured to the mounting block, the armature is rotationally pinned to the mechanical body, and the spring is secured by the mechanical body. Each spring is configured to apply a resisting force on the armature. The at least one hole is approximately centered between the two armatures. A pre-fabricated wall panel comprising at least one apparatus for securing pre-fabricated wall panels to foundation anchor bolts is also provided. A method is provided for assembly and installation of the pre-fabricated wall panel.

20 Claims, 9 Drawing Sheets

US 11,072,923 B2

METHOD AND APPARATUS FOR ATTACHING PRE-FABRICATED WALLS TO FOUNDATION ANCHOR BOLTS

CROSS REFERENCE TO RELATED APPLICATION

This application claims the benefit of U.S. Provisional Application No. 62/745,924 for Method and Apparatus for Attaching Pre-Fabricated Walls to Foundation Anchor Bolts filed on Oct. 15, 2018, which is incorporated by reference as if fully set forth.

FIELD OF INVENTION

The present invention relates generally to the art of exterior walls of buildings, and more specifically to an apparatus that secures a wall panel to the foundation, a wall panel, and the method of assembly and installation thereof.

BACKGROUND

A traditionally built exterior building wall is typically constructed by bolting the structural frame of the wall to the foundation. Anchor bolts fixed to the foundation secure the wall frame and other components to the concrete slab foundation. Most commonly, anchor bolts are cast-in-place in preset positions, wherein the bolt head is cast into the concrete and the threaded end extends out of the foundation. The structural frame of the wall is constructed by securing the bottom plate to the foundation. The bottom plate is secured by predrilling holes into the bottom plate. The size and placement of the holes correspond with the position of the anchor bolts. The bottom plate is placed flat on the concrete foundation with the threaded ends of the anchor bolts extending up through the holes of the bottom plate. The nut of the anchor bolt is screwed onto the bolt threads to secure the bottom plate. The remaining components of the exterior wall are then installed.

However, some wall systems are constructed from pre-fabricated wall panels. A wall panel may be assembled with the structural frame attached to the wall's interior and exterior components. In this case, after the pre-fabricated wall panel is placed onto the threaded ends of the anchor bolts, the anchor bolts are no longer accessible to screw the nut onto the anchor bolt threads. Because the threads of the anchor bolts are no longer accessible, there is no way to secure the pre-fabricated wall panel to the anchor bolt or foundation.

SUMMARY

An apparatus for securing pre-fabricated wall panels to foundation anchor bolts is provided. The apparatus includes a mounting block including at least one hole and at least two facing spring assemblies. Each spring assembly includes a mechanical body, a spring, and an armature. The mechanical body is secured to the mounting block, the armature is rotationally pinned to the mechanical body, and the spring is secured to the mechanical body. Each spring is configured to apply a resisting force on the armature. The at least one hole is approximately centered between the two armatures.

A pre-fabricated wall panel comprising at least one apparatus for securing pre-fabricated wall panels to foundation anchor bolts and methods for assembling and installing the pre-fabricated wall panel are also provided.

BRIEF DESCRIPTION OF THE DRAWINGS

The foregoing summary, as well as the following detailed description will be better understood when read in conjunction with the appended drawings. For the purpose of illustrating the apparatus for securing pre-fabricated wall panels to foundation anchor bolts, there is shown in the drawings embodiments which are presently preferred. It should be understood, however, that the apparatus for securing pre-fabricated wall panels to foundation anchor bolts is not limited to the precise arrangement shown.

DETAILED DESCRIPTION

In one aspect, an apparatus for securing a pre-fabricated wall panel to a foundation anchor bolt is provided. The apparatus includes a mounting block to secure the apparatus to the interior of the wall panel. The apparatus also includes at least two facing spring assemblies comprising a mechanical body, a spring, and an armature. The armature is rotationally pinned to the mechanical body which is secured to the mounting block. The apparatus is secured to the interior of the pre-fabricated wall panel. As the wall panel is installed onto the foundation anchor bolt, the anchor bolt inserts into the pre-fabricated wall panel and through the apparatus inside the wall panel. The apparatus grips the anchor bolt thereby securing the pre-fabricated wall panel to the foundation.

Figure 1:
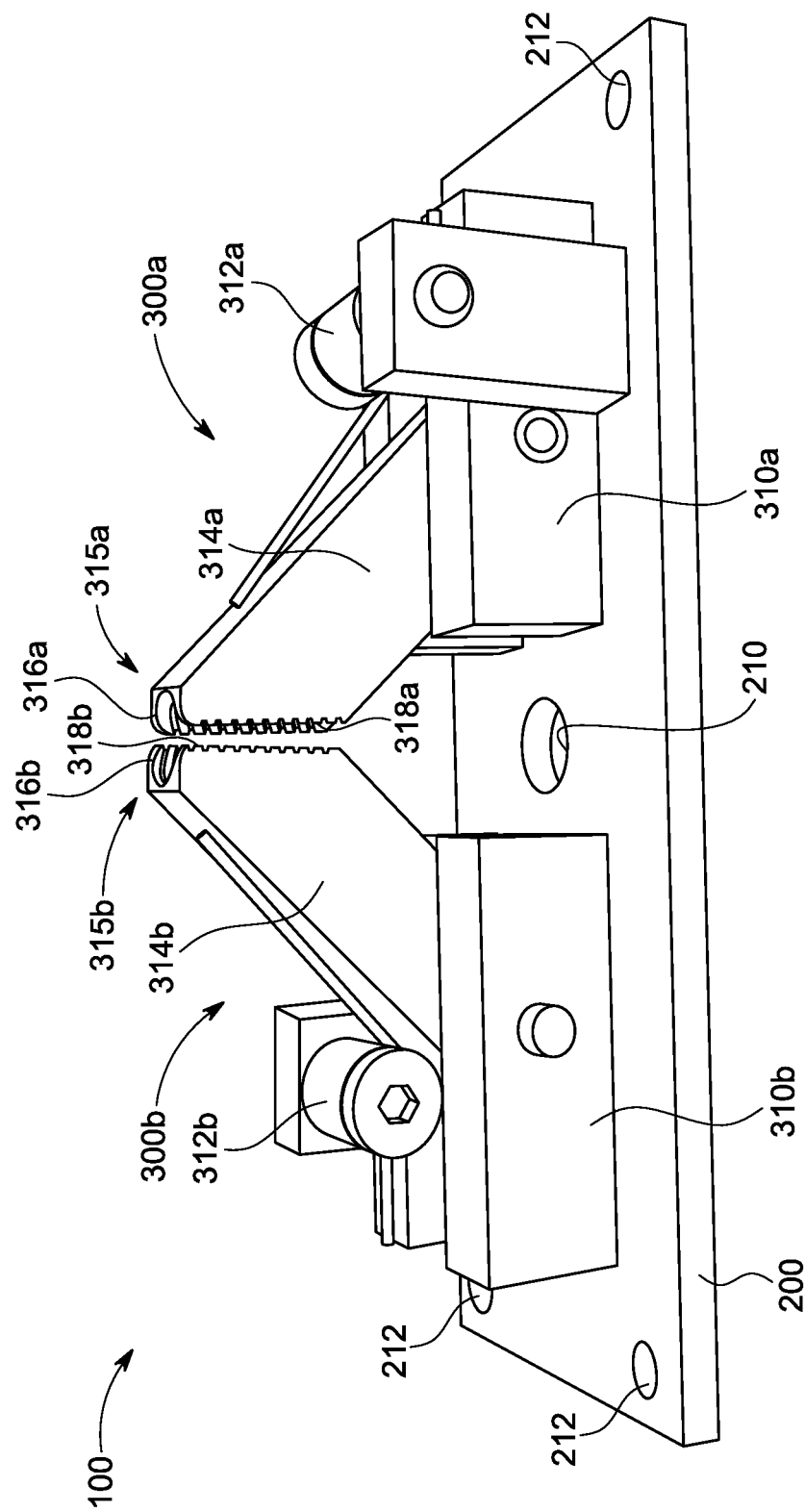
FIG. 1 is a front perspective view of an apparatus for securing pre-fabricated wall panels to foundation anchor bolts.

FIG. 1 is a front perspective view of an apparatus 100 for securing pre-fabricated wall panels to foundation anchor bolts. The apparatus 100 includes a mounting block 200 with at least one hole 210 and at least two facing spring assemblies 300*a*, 300*b*. The mounting block 200 allows the apparatus 100 to be secured to a structure such as the interior surface of the bottom plate 810 of a wall panel 700 (not shown in FIG. 1 for clarity), as will be discussed in more detail herein. The mounting block 200 also includes a plurality of apertures 212. The apertures 212 are configured to secure the mounting block 200 to the structure with bolts, screws, nails or other suitable connectors known in the art. Alternatively, the mounting block 200 may be adhered to the structure. The apparatus 100 may be made out of galvanized steel, mild steel, titanium, aluminum, or any rigid material that has strength properties suitable for securing a pre-fabricated wall panel to foundation anchor bolts.

The apparatus 100 includes a first spring assembly 300a and a second spring assembly 300b. The spring assemblies 300a, 300b are configured to engage and clamp a structure such as a foundation anchor bolt 500 (not shown in FIG. 1 for clarity) as will be discussed in more detail herein. The first spring assembly 300a includes a first mechanical body 310a, a first spring 312a, and a first armature 314a. The first mechanical body 310a is secured to the mounting block 200. The first armature 314a is rotationally pinned to the first mechanical body 310a. The first spring 312a is secured to the first mechanical body 310a.

The second spring assembly 300b includes a second mechanical body 310b, a second spring 312b, and a second armature 314b. The second mechanical body 310b is secured to the mounting block 200. The second armature 314b is rotationally pinned to the second mechanical body 310b. The second spring 312b is secured to the second mechanical body 310b.

The first mechanical body 310a of the first spring assembly 300a and the second mechanical body 310b of the second spring assembly 300b may be welded, bolted, or otherwise secured to the mounting block 200. The mechanical bodies 310a, 310b may be made from a rigid material such as galvanized steel or aluminum. More specifically, the first mechanical body 310a and the second mechanical body 310b may be 1½"×2½"×¾" metal blocks. The mechanical bodies 310a, 310b provide a base for the first armature 314a and second armature 314b and the first spring 312a and the second spring 312b. The mechanical bodies 310a, 310b secure the armatures 314a, 314b and the springs 312a, 312b to the mounting block 200.

The first armature 314a is rotationally pinned to the first mechanical body 310a and the second armature 314b is rotationally pinned to the second mechanical body 310b. The first armature 314a has a first distal end 315a and the second armature 314b has a second distal end 315b. The first armature 314a and the second armature 314b are each pinned at the end opposite the first distal end 315a and second distal end 315b. The armatures 314a, 314b are pinned at the opposite ends to allow the distal ends 315a, 315b to rotate about the pin so that the distal ends 315a, 315b align with the hole 210 in the mounting block 200 when the armatures 314a, 314b are at rest. The distal ends 315a, 315b may rotate towards and away from the hole 210 in the mounting block 200. The first distal end 315a of the first armature 314a opposes the second distal end 315b of the second armature 314b so that a structure, such as an anchor bolt 500, can be pinched or clamped between the distal ends 315a, 315b. The first distal end 315a and second distal end 315b each include a recessed radius 316a, 316b. The radius 316a, 316b of the first distal end 315a and second distal end 315b include teeth 318a, 318b. The radius 316a, 316b and teeth 318a, 318b are designed to grasp a structure such as an anchor bolt 500.

The first spring assembly 300a includes a first spring 312a and the second spring assembly 300b includes a second spring 312b. As shown in FIG. 1, the first spring 312a and the second spring 312b may be leg springs. However, other types of springs or flexing mechanisms may be used. Moreover, the spring constant of the first spring 312a and the second spring 312b may vary and depend on design loads. The first spring 312a applies a constant resisting force on the first armature 314a and the second spring 312b applies a constant resisting force on the second armature 314b. The first spring 312a and second spring 312b provide a resisting force on the armatures 314a, 314b towards the hole 210 in the mounting block 200 yet allows the armatures to slightly rotate away from the hole 210 in the mounting block 200. As described in more detail here, an anchor bolt 500 extends up through the hole 210 in the mounting block 200. When the end of the anchor bolt 500 reaches the armatures 314a, 314b, the springs 312a, 312b allow the distal ends 315a, 315b of the armatures 314a, 314b to be pushed or rotated away by the anchor bolt 500. After the anchor bolt 500 extends up through the armatures 314a, 314b, the springs 312a, 312b provide sufficient resisting force to push the armatures 314a, 314b towards the anchor bolt to grasp and clamp the anchor bolt 500. The springs 312a, 312b provide enough resisting force to anchor a structure, such as a pre-fabricated wall panel 700, to the anchor bolt 500.

Although FIG. 1 depicts an apparatus 100 with two spring assemblies 300a, 300b, the apparatus may include additional spring assemblies. For example, the apparatus 100 may include four spring assemblies centered around the hole 210 in the mounting block 200. In this embodiment, the distal ends of the armatures of the third and fourth spring assemblies oppose one another. Additional spring assemblies include the same details and embodiments of the first spring assembly 300a and the second spring assembly 300b.

Figure 2:
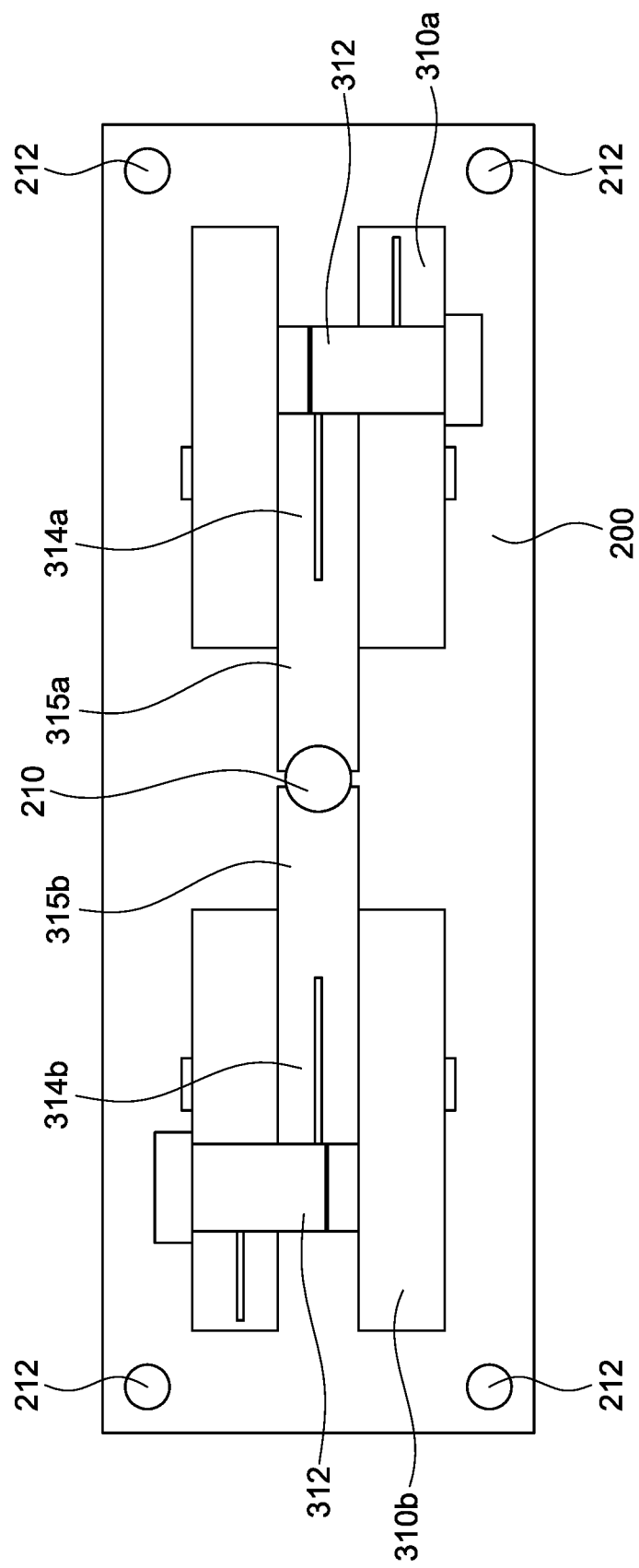
FIG. 2 is a plan view of the apparatus for securing pre-fabricated wall panels to foundation anchor bolts.

FIG. 2 is a plan view of the apparatus 100 for securing pre-fabricated wall panels to foundation anchor bolts. The mounting block 200 includes at least one hole 210. The at least one hole 210 is located approximately in the center of the mounting block 200 and is approximately centered between the first armature 314a and the second armature 314b. The diameter of the hole 210 should approximately match the desired diameter of a foundation anchor bolt 500 (not shown in FIG. 2 for clarity). For example, if the foundation anchor bolt is a ½" diameter bolt, the hole 210 would have a diameter that is ½" or slightly larger to allow the anchor bolt 500 to extend up into the apparatus 100. Different diameter anchor bolts 500 may be desired, resulting in a different corresponding diameter of the hole 210. The hole 210 allows the anchor bolt 500 to extend up into the apparatus 100. The hole 210 is dimensioned to fit the anchor bolt 500 and guide the anchor bolt 500 up through the apparatus 100 to the armatures 314a, 314b.

The first distal end 315a of the first armature 314a and the second distal end 315b of the second armature 314b are cut on a radius. The radius of the first distal end 315a and the second distal end 315b correspond to the diameter of the hole 210 in the mounting block 200 and the diameter of a desired anchor bolt 500. The distal ends 315a, 315b are cut on a radius to sufficiently grasp and clamp a substantial part of the circumference of the anchor bolt 500. The mounting block 200 may include apertures 212 configured to secure the mounting block 200 to a bottom plate 810 of a wall panel 700 as described in further detail herein. More specifically, the apertures 212 may be dimensioned to receive a ¼×1½" lag screw.

Figure 3:
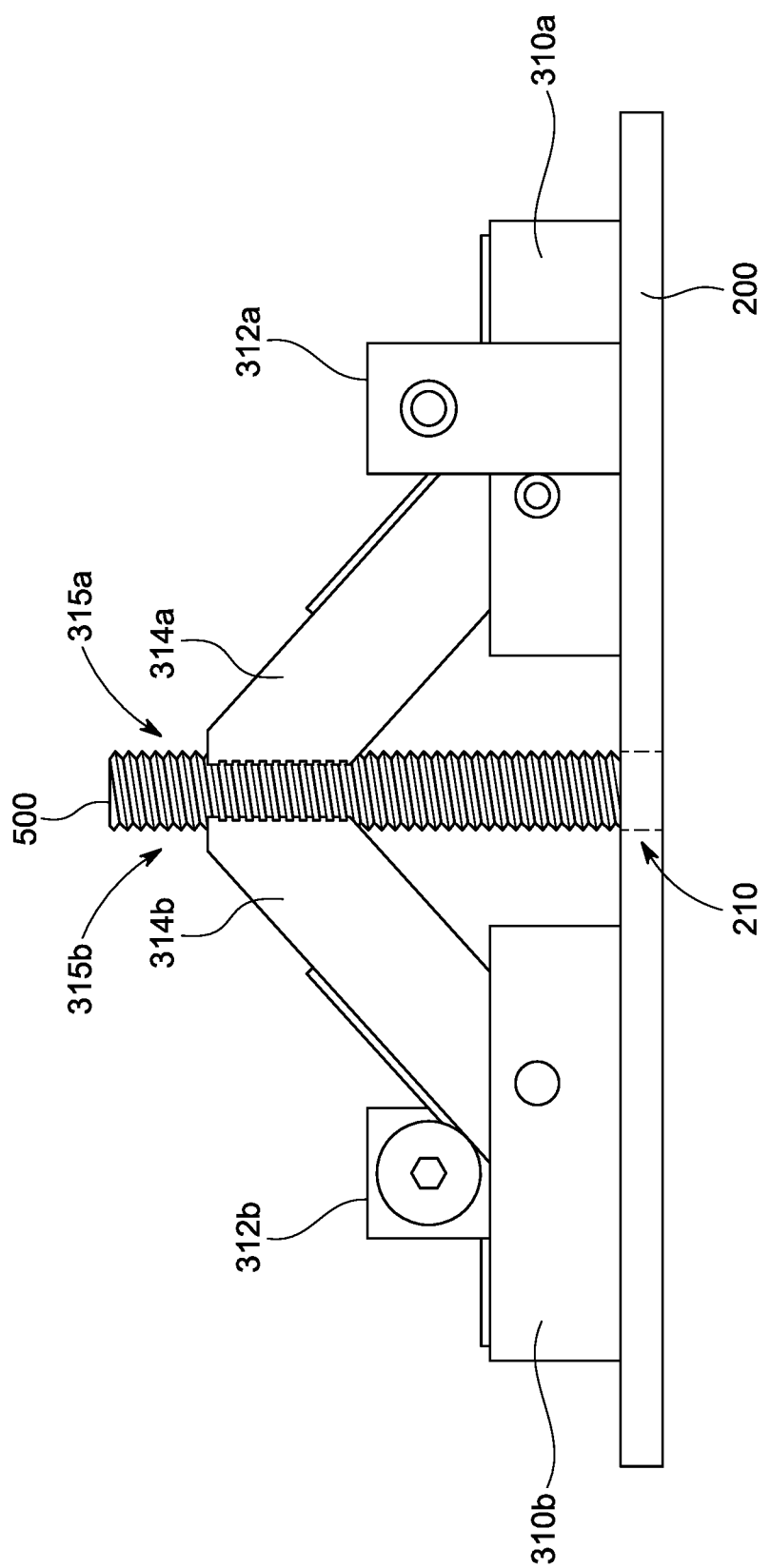
FIG. 3 is a front elevation view of the apparatus for securing pre-fabricated wall panels to foundation anchor bolts including a foundation anchor bolt.

FIG. 3 is a front elevation view of the apparatus 100 for securing pre-fabricated wall panels to foundation anchor bolts including a foundation anchor bolt 500. The anchor bolt 500 may be a ¼" through a 2" diameter anchor bolt. More specifically, the anchor bolt 500 may be a ½" diameter anchor bolt. An anchor bolt 500 extends through the hole 210 in the mounting block 200. The anchor bolt 500 may include an end that has threads. Alternatively, the shaft of the anchor bolt 500 may include a form of indentations or recesses. The teeth 318a, 318b of the first distal end 315a and the second distal end 315b have a pattern that matches the thread pitch of the anchor bolt 500. Alternatively, the teeth 318a, 318b match the pattern of the indentations or recesses. The threads, indentations, or recesses allow the teeth 318a, 318b of the distal ends 315a, 315b to engage with the anchor bolt 500. The threads, indentations, or recesses create a surface area for the teeth 318a, 318b to engage with. The teeth 318a, 318b and threads, indentations, or recesses interlock to allow the distal ends 315a, 315b of the armatures 314a, 314b to grip the anchor bolt 500. The first spring 312a and the second spring 312b allow the first armature 314a and the second armature 314b to rotate away from the center as the anchor bolt 500 is inserted. The interlocked teeth 318a, 318b and threads help prevent the anchor bolt 500 from sliding vertically between the distal ends 315a, 315b of the armatures 314a, 314b once the anchor bolt 500 is completely inserted. The first spring 312a and the second spring 312b provide a resisting force on the first armature 314a and the second armature 314b. This resisting force translates to a clamping force on the anchor bolt 500 by the armatures 314a, 314b. The clamping force secures the apparatus 100 to the anchor bolt 500. A structure, such as a pre-fabricated wall panel 700, secured to the apparatus 100 is thereby secured to the anchor bolt 500.

Figure 4:
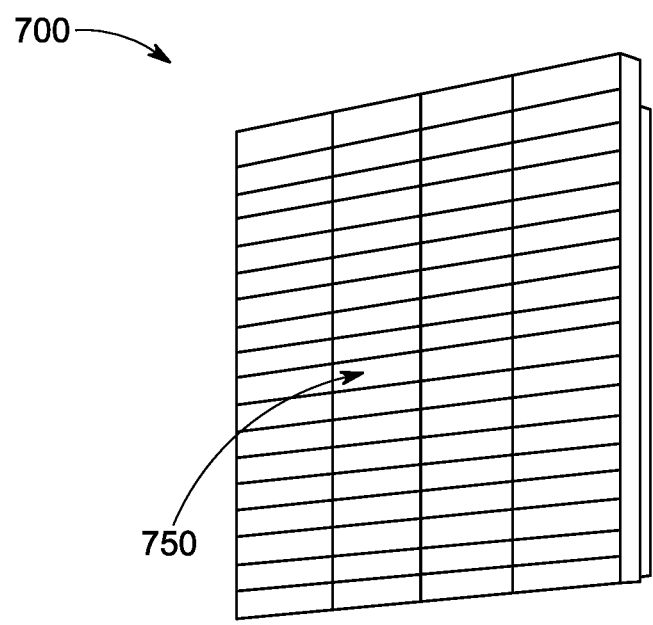
FIG. 4 is a front, right perspective view of a pre-fabricated wall panel.

FIG. 4 is a front, right perspective view of a pre-fabricated wall panel 700. The wall panel 700 includes an exterior infill component 750 and an interior structural component (not shown in FIG. 4. The interior structural component includes a structural frame 800. The pre-fabricated wall panel 700 may be constructed prior to arriving to the job site. Pre-fabricated wall panels 700 may be transported to a job site and installed to form the exterior wall of a building. The first floor wall panels 700 secures to a foundation via foundation anchor bolts 500 to transfer wall loads to the foundation.

Figure 5:
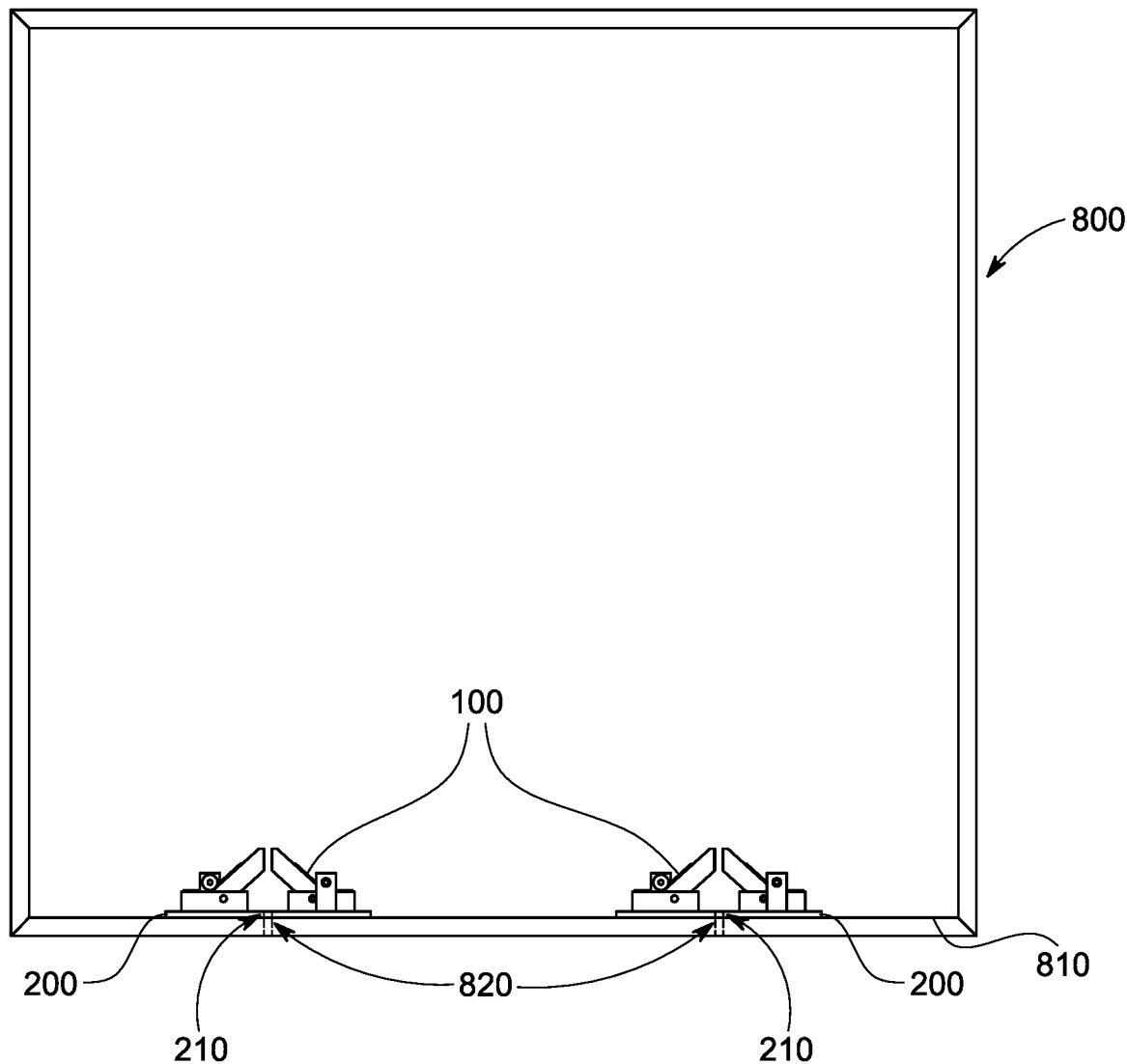
FIG. 5 is a front, elevation view of the structural frame of the pre-fabricated wall panel and apparatuses for securing pre-fabricated wall panels to foundation anchor bolts.

FIG. 5 is a front, elevation view of the structural frame 800 of the pre-fabricated wall panel 700 and apparatuses 100 for securing pre-fabricated wall panels to foundation anchor bolts. FIG. 5 shows the pre-fabricated wall panel 700 with the exterior infill component 750 removed to illustrate the interior of the wall panel 700. The apparatus 100 for securing pre-fabricated wall panels is enclosed within the wall panel 700 once the wall panel 700 is completely assembled, as shown in FIG. 4. The structural frame 800 including a bottom plate 810. The wall panel 700 also includes at least one apparatus 100 for securing pre-fabricated wall panels to foundation anchor bolts. The apparatus 100 for securing pre-fabricated wall panels to foundation anchor bolts includes the embodiments described in detail herein. Each apparatus 100 is secured to the bottom plate 810. The apparatus 100 is secured to the bottom plate 810 to become integral with the structural frame 800 and the pre-fabricated wall panel 700. As previously discussed, the mounting block 200 of the apparatus 100 may be secured to the bottom plate 810 with ¼×1½" lag screws. Alternatively, the mounting block 200 of the apparatus 100 may be secured to the bottom plate 810 with different dimensioned screws, with nails, or with adhesive. The bottom plate 810 includes an opening 820 that aligns with the hole 210 in the mounting block 200 of the apparatus 100. The opening 820 in the bottom plate 810 allows an anchor bolt 500 to extend through the bottom plate 810 and into the pre-fabricated wall panel 700. The opening 820 guides the anchor bolt 500 through the hole 210 in the mounting block 200 of the apparatus 100.

Figure 6:
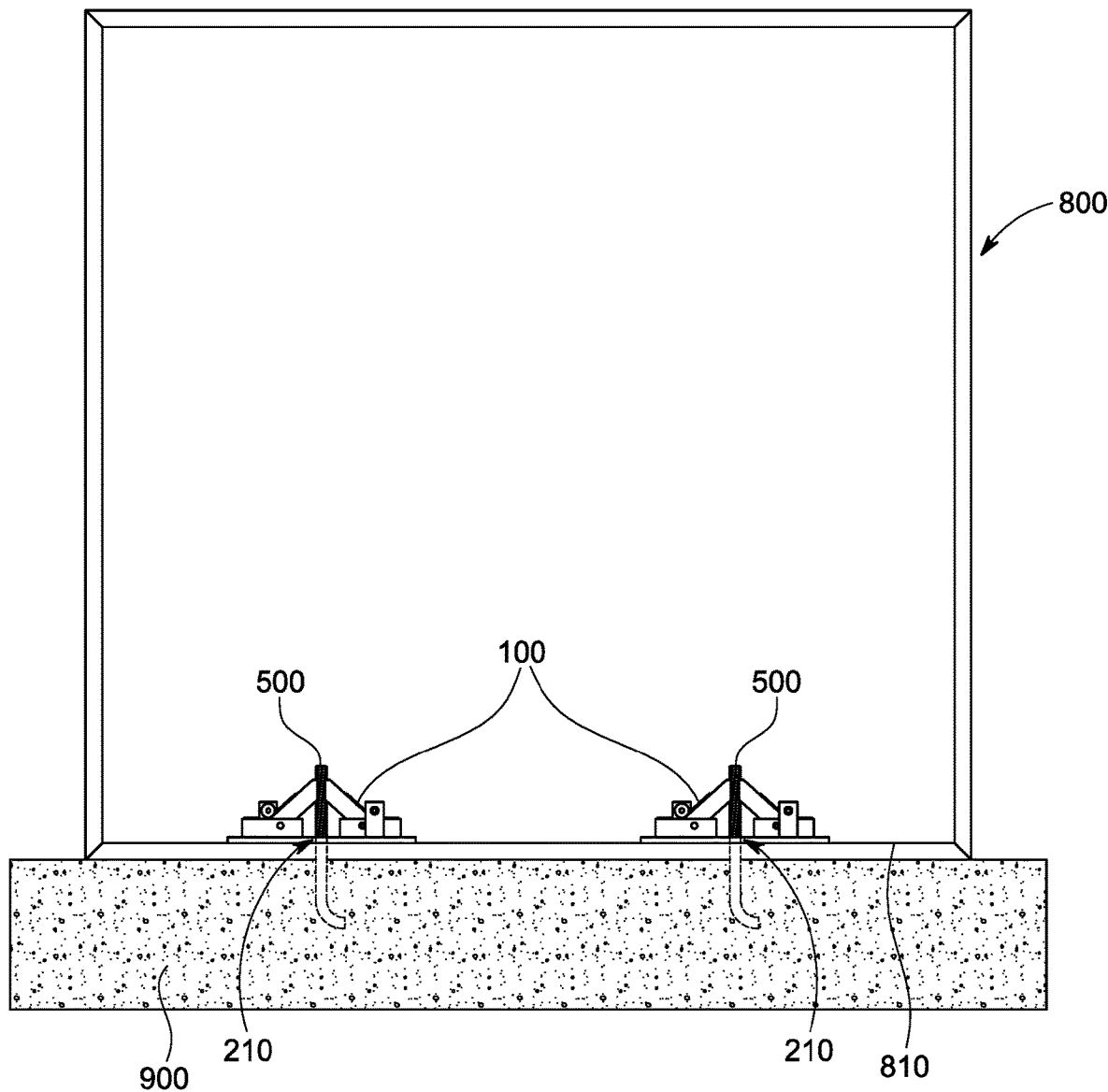
FIG. 6 is a front, elevation view of the structural frame of the pre-fabricated wall panel secured to two foundation anchor bolts via two apparatuses for securing pre-fabricated wall panels to foundation anchor bolts.

FIG. 6 is a front, elevation view of the structural frame 800 of the pre-fabricated wall panel 700 secured to two foundation anchor bolts 500 via two apparatuses 100 for securing pre-fabricated wall panels to foundation anchor bolts. Like FIG. 5, FIG. 6 shows the pre-fabricated wall panel 700 with the exterior infill component 750 not shown to show the interior of the wall panel 700. The wall panel 700 includes an apparatus 100 for each location the wall panel 700 is designed to be secured to a foundation anchor bolt 500. For example, if the wall panel 700 is designed to be secured to two anchor bolts 500, two apparatuses 100 are provided, as shown in FIG. 6. The end of the anchor bolt 500 extends up through the opening 820 in the bottom plate 810 of the wall panel 700 and the hole 210 in the mounting block 200 of the apparatus 100. The anchor bolt 500 pushes the first armature 314a and second armature 314b away to extend there through. The resisting force from the first spring 312a and second spring 312b on the armatures 314a, 314b force the distal end 315a of the first armature 314a and the second distal end 315b of the second armature 314b to clamp the anchor bolt 500. The teeth 318a, 318b of the distal ends 315a, 315b engage with the threads, indentations, or recesses of the anchor bolt 500 as previously shown in FIG. 3. The apparatuses 100 are connected to the pre-fabricated wall panel 700 and the apparatuses 100 engage with the anchor bolts 500 thereby securing the pre-fabricated wall panel 700 to the foundation anchor bolts 500. The wall panel 700 is held to the foundation 900 via the apparatus 100 and anchor bolt 500 connection. The apparatuses 100 transfer load from the wall panel 700 to the foundation 900.

Figure 9:
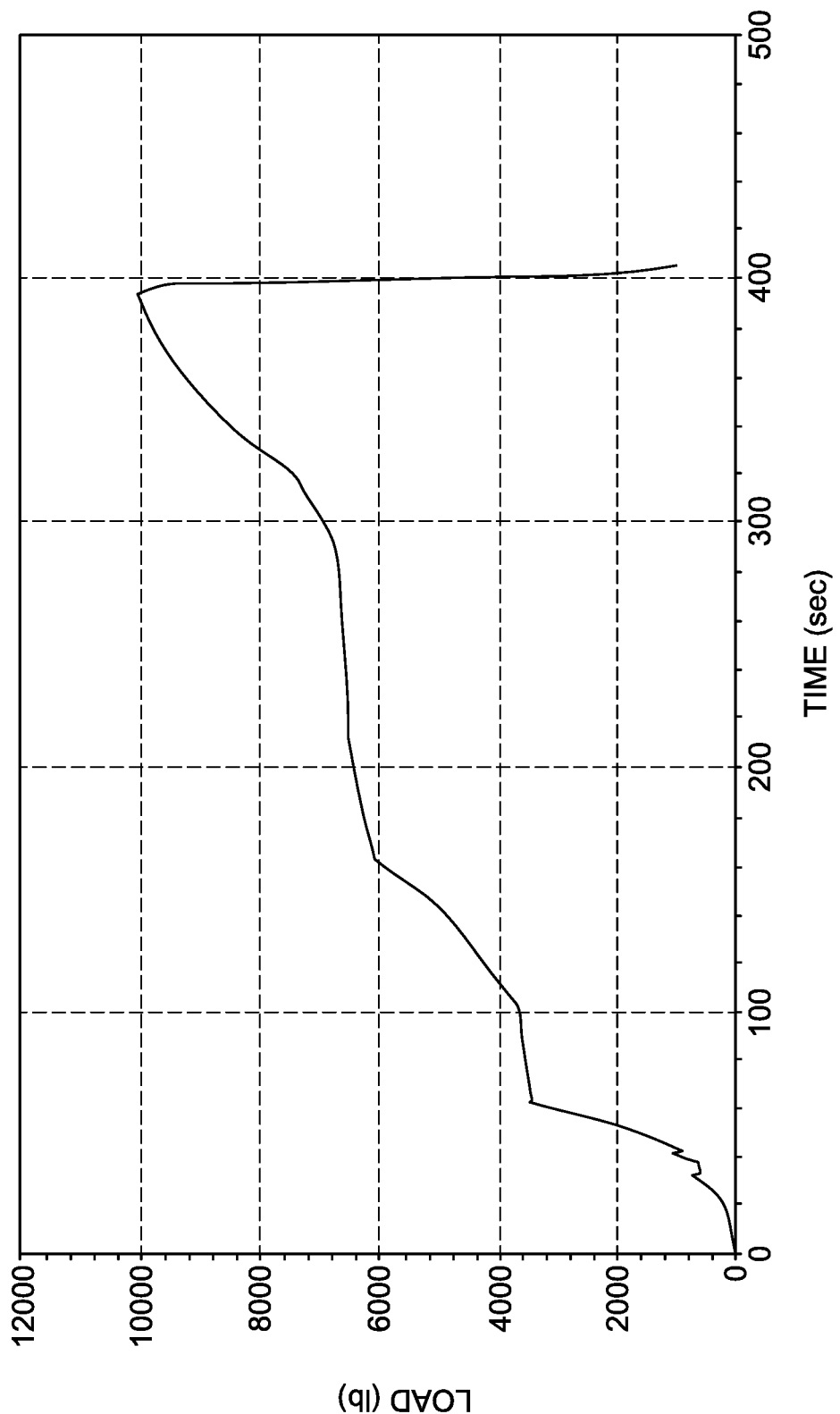
FIG. 9 is a graph depicting the performance of the apparatus for securing pre-fabricated wall panels to foundation anchor bolts.

FIG. 9 is a graph depicting the performance of the apparatus 100 for securing pre-fabricated wall panels to foundation anchor bolts. The apparatus 100 for securing pre-fabricated wall panels to foundation anchor bolts is designed to withstand and transfer loads from the pre-fabricated wall panels 700 to the foundation 900 through the anchor bolt 500. The apparatus 100 may be designed to withstand the loads depicted in the graph in FIG. 9. In the graph in FIG. 9, the peak load is 10050 lb. The apparatus 100 may be designed to withstand a peak stress of at least 10050 psi and have a modulus of elasticity of at least 152349 psi. The apparatus 100 may withstand loads applied to the wall panel 100 and the anchor bolt 100.

Figure 7:
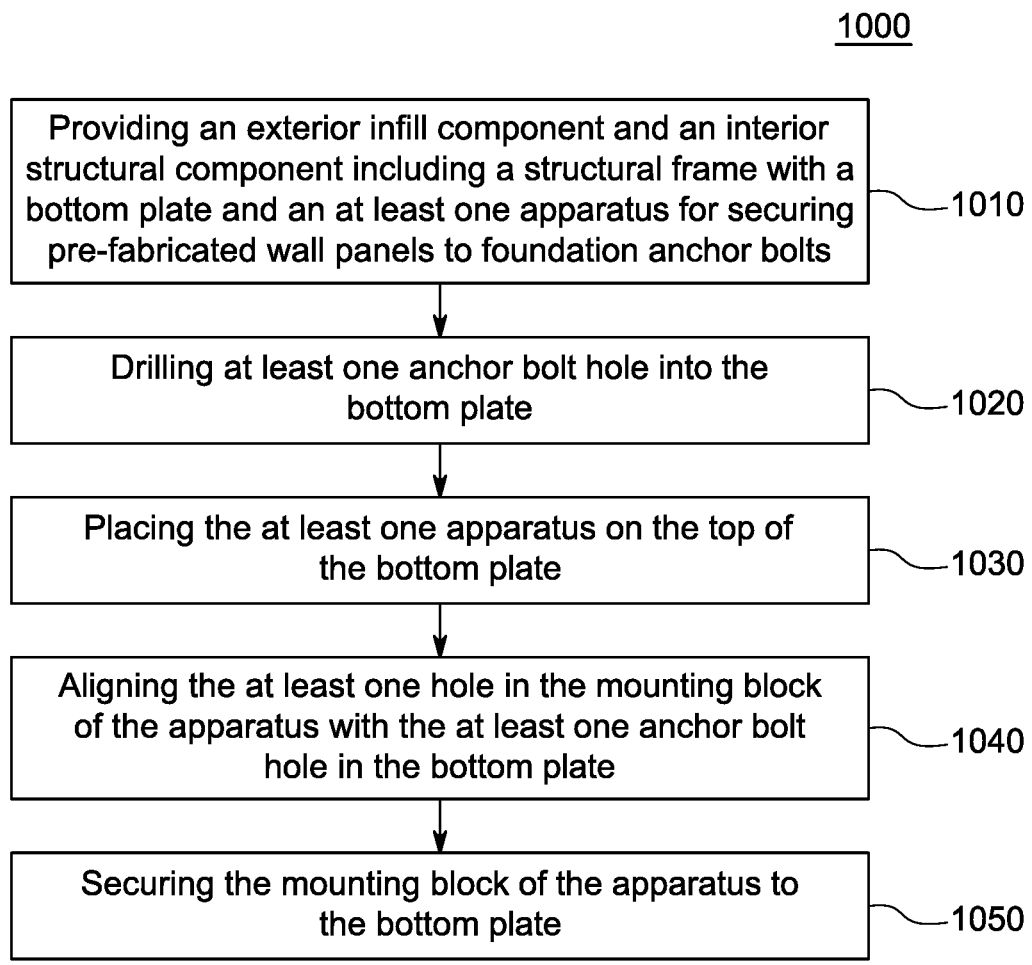
FIG. 7 is a flow chart depicting a method of assembling a pre-fabricated wall panel.

FIG. 7 is a flow chart depicting a method 1000 of assembling a pre-fabricated wall panel 700. The wall panel 700 is constructed for installation in the field according to the method 1000 described in the flow chart. First 1010, the components of the wall panel 700 including at least one apparatus 100 for securing the wall panel to a foundation anchor bolt are provided. Second 1020, at least one opening 820 is drilled into the bottom plate 810 of the wall panel 700. An opening 820 is drilled into the bottom plate 810 at each location the wall panel 700 is designed to be secured to a foundation anchor bolt 500 at the job site. Third 1030, an apparatus 100 for securing the pre-fabricated wall panel to the foundation anchor bolt is placed onto the top or interior surface of the bottom plate 810 at every location the wall panel 700 is to be secured to an anchor bolt 500. Fourth 1040, the at least one hole 210 in the mounting block 200 of the apparatus 100 is aligned with the opening 820 in the bottom plate 810. Fifth 1050, the mounting block 200 of the apparatus 100 is secured to the bottom plate 810. The exterior infill components 750 of the wall panel 700 may then be installed to complete the assembly of the wall panel 700.

Figure 8:
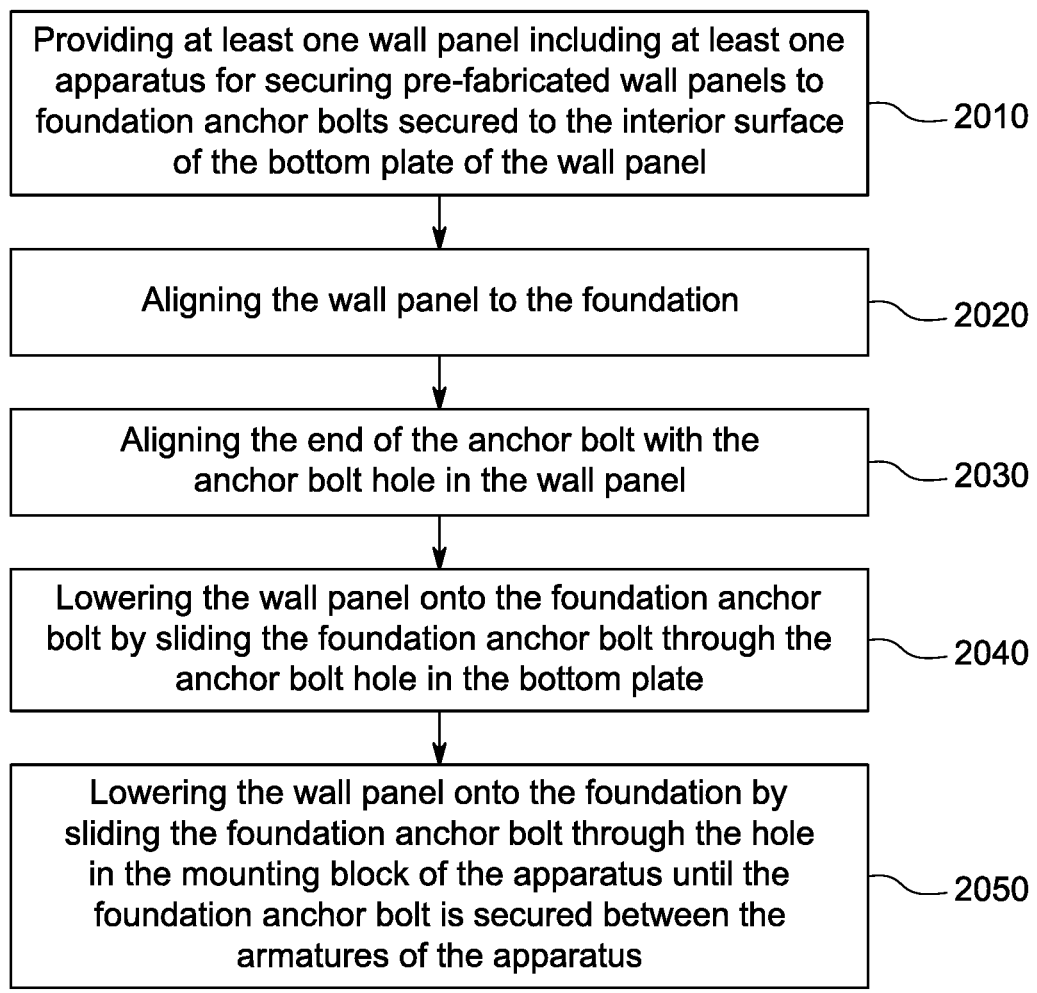
FIG. 8 is a flow chart depicting a method of installing a pre-fabricated wall panel.

FIG. 8 is a flow chart depicting a method 2000 of installing a pre-fabricated wall panel 700. First 2010, at least one wall panel 700 is provided. The wall panel 700 includes the details and embodiments described herein. Second 2020, the wall panel 700 is aligned over the foundation anchor bolts 500 designed to secure the wall panel 700 to the foundation 900. Third 2030, each opening 820 in the bottom plate 810 of the wall panel 700 is aligned with its respective foundation anchor bolt 500. Fourth 2040, the wall panel 700 is placed down over the foundation anchor bolts 500 designed to secure the wall panel 700 to the foundation 900 by sliding each anchor bolt 500 into its respective opening 820 in the bottom plate 810. Finally 2050, the foundation anchor bolts 500 are slid through the holes 210 in the mounting blocks 200 of each respective apparatus 100 within the wall panel 700 until the threads, indentations, or recesses of the anchor bolts 500 are engaged between the first armature 314a and second armature 314b of each apparatus 100. This method secures the wall panel 700 to the foundation 900. More specifically, at each anchor bolt 500 location, the foundation anchor bolt 500 enters the apparatus 100 through the hole 210 in the mounting block 200, pushes the first armature 314a and the second armature 314b apart, compressing the first spring 312a and the second spring 312b, and continues upward until the threads, indentations, or recesses of the anchor bolt 500 snap into place by engaging with the teeth 318a, 318b of the first armature 314a and second armature 314b.

Having thus described in detail a preferred selection of embodiments of the present apparatus for securing pre-fabricated wall panels to foundation anchor bolts, it is to be appreciated and will be apparent to those skilled in the art that many physical changes could be made to the apparatus for securing pre-fabricated wall panels to foundation anchor bolts without altering the inventive concepts and principles embodied therein. The present embodiments are therefore to be considered in all respects as illustrative and not restrictive, the scope being indicated by the appended claims rather than by the foregoing description, and all changes which come within the meaning and range of equivalency of the claims are therefore to be embraced therein.

What is claimed is:

1. An apparatus for securing pre-fabricated wall panels to foundation anchor bolts comprising:
   a mounting block including at least one hole; and
   at least two facing spring assemblies;
   a first of the at least two facing spring assemblies including a first mechanical body, a first spring, and a first armature with the first mechanical body secured to the mounting block, the first armature rotationally pinned to the first mechanical body, and the first spring secured by the first mechanical body;
   the first spring configured to apply a first resisting force on the first armature;
   a second of the at least two facing spring assemblies including a second mechanical body, a second spring, and a second armature with the second mechanical body secured to the mounting block, the second armature rotationally pinned to the second mechanical body, and the second spring secured by the second mechanical body;
   the second spring configured to apply a second resisting force on the second armature;
   wherein the at least one hole is approximately centered between the first armature and the second armature.

2. The apparatus of claim 1 further comprising a third spring assembly including a third mechanical body, a third spring, and a third armature with the third mechanical body secured to the mounting block, the third armature rotationally pinned to the third mechanical body, and the third spring secured by the third mechanical body; and
   the third spring configured to apply a third resisting force on the third armature.

3. The apparatus of claim 1 further comprising a fourth spring assembly including a fourth mechanical body, a fourth spring, and a fourth armature with the fourth mechanical body secured to the mounting block, the fourth armature rotationally pinned to the fourth mechanical body, and the fourth spring secured by the fourth mechanical body; and
   the fourth spring configured to apply a fourth resisting force on the fourth armature.

4. The apparatus of claim 1, wherein the mounting block includes a plurality of screw holes.

5. The apparatus of claim 1, wherein the first armature includes a first radius cut into a first distal end and the second armature includes a second radius cut into a second distal end.

6. The apparatus of claim 5, wherein the first distal end includes a first pair of teeth and the second distal end includes a second pair of teeth.

7. The apparatus of claim 6, wherein the first pair of teeth and the second pair of teeth are each configured to match a bolt thread pitch.

8. The apparatus of claim 5, wherein the first radius and the second radius correspond to a bolt radius.

9. The apparatus of claim 1, wherein the at least one hole has a diameter corresponding to a bolt diameter.

10. The apparatus of claim 1, wherein the first spring and the second spring are leg springs.

11. The apparatus of claim 1, wherein the mounting block includes a plurality of apertures.

12. A pre-fabricated wall panel comprising:
    an exterior infill component;
    an interior structural component including a structural frame with a bottom plate; and
    at least one apparatus for securing pre-fabricated wall panels to foundation anchor bolts secured to a top of the bottom plate;
    each of the at least one apparatus for securing pre-fabricated wall panels to foundation anchor bolts including:
      a mounting block including at least one hole; and
      at least two facing spring assemblies;
      a first of the at least two facing spring assemblies including a first mechanical body, a first spring, and a first armature with the first mechanical body secured to the mounting block, the first armature rotationally pinned to the first mechanical body, and the first spring secured by the first mechanical body;
      the first spring configured to apply a first resisting force on the first armature;
      a second of the at least two facing spring assemblies including a second mechanical body, a second spring, and a second armature with the second mechanical body secured to the mounting block, the second armature rotationally pinned to the second mechanical body, and the second spring secured by the second mechanical body;
      the second spring configured to apply a second resisting force on the second armature;
      wherein the at least one hole is approximately centered between the first armature and the second armature.

13. The wall panel of claim 12, wherein the at least one hole has a diameter corresponding to a bolt diameter.

14. The wall panel of claim 12, wherein the bottom plate includes at least one anchor bolt hole aligned with the at least one hole of the mounting block.

15. The wall panel of claim 12, wherein the first armature includes a first radius cut into a first distal end and the second armature includes a second radius cut into a second distal end.

16. The wall panel of claim 15, wherein the first radius and the second radius correspond to a bolt radius.

17. The wall panel of claim 15, wherein the first distal end includes a first pair of teeth and the second distal end includes a second pair of teeth.

18. The wall panel of claim 17, wherein the first pair of teeth and the second pair of teeth are each configured to match a bolt thread pitch.

19. A method of assembling a wall panel comprising:
providing an exterior infill component and an interior structural component including a structural frame with a bottom plate;
providing at least one apparatus for securing pre-fabricated wall panels to foundation anchor bolts, the apparatus including:
a mounting block including at least one hole; and
at least two facing spring assemblies;
a first of the at least two facing spring assemblies including a first mechanical body, a first spring, and a first armature with the first mechanical body secured to the mounting block, the first armature rotationally pinned to the first mechanical body, and the first spring secured by the first mechanical body;
the first spring configured to apply a first resisting force on the first armature;
a second of the at least two facing spring assemblies including a second mechanical body, a second spring, and a second armature with the second mechanical body secured to the mounting block, the second armature rotationally pinned to the second mechanical body, and the second spring secured by the second mechanical body;
the second spring configured to apply a second resisting force on the second armature;
wherein the at least one hole is approximately centered between the first armature and the second armature;
wherein the first armature includes a first radius cut into a first distal end and the second armature includes a second radius cut into a second distal end;
wherein the first distal end includes a first pair of teeth and the second distal end includes a second pair of teeth;
drilling at least one anchor bolt hole into the bottom plate;
placing the at least one apparatus for securing pre-fabricated wall panels to foundation anchor bolts onto a top of the bottom plate;
aligning the at least one hole of the at least one apparatus for securing pre-fabricated wall panels to foundation anchor bolts with the at least one anchor bolt hole in the bottom plate; and
securing the mounting block to the bottom plate.

20. A method of installing a wall panel comprising:
installing a foundation anchor bolt and foundation, the foundation anchor bolt including a threaded end extending out of the foundation;
receiving the wall panel, the wall panel including an exterior infill component, an interior structural component including a structural frame with a bottom plate including at least one anchor bolt hole, and at least one apparatus for securing pre-fabricated wall panels to foundation anchor bolts secured to an interior surface of the bottom plate, the at least one apparatus for securing pre-fabricated wall panels to foundation anchor bolts including:
a mounting block including at least one hole; and
at least two facing spring assemblies;
a first of the at least two facing spring assemblies including a first mechanical body, a first spring, and a first armature with the first mechanical body secured to the mounting block, the first armature rotationally pinned to the first mechanical body, and the first spring secured by the first mechanical body;
the first spring configured to apply a first resisting force on the first armature;
a second of the at least two facing spring assemblies including a second mechanical body, a second spring, and a second armature with the second mechanical body secured to the mounting block, the second armature rotationally pinned to the second mechanical body, and the second spring secured by the second mechanical body;
the second spring configured to apply a second resisting force on the second armature;
wherein the at least one hole is approximately centered between the first armature and the second armature and is aligned with the at least one anchor bolt hole;
wherein the first armature includes a first radius cut into a first distal end and the second armature includes a second radius cut into a second distal end;
wherein the first distal end includes a first pair of teeth and the second distal end includes a second pair of teeth; and
lowering the wall panel onto the foundation by inserting the foundation anchor bolt into the wall panel through the at least one anchor bolt hole in the bottom plate and the at least one hole in the mounting block until the threaded end of the foundation anchor bolt engages the first pair of teeth and the second pair of teeth.

* * * * *